Jan. 22, 1952 J. F. CACHAT 2,582,963
SEAM WELDING APPARATUS
Filed May 7, 1949 2 SHEETS—SHEET 1

INVENTOR.
JOHN F. CACHAT
BY
Alfred C. Body
ATTORNEY

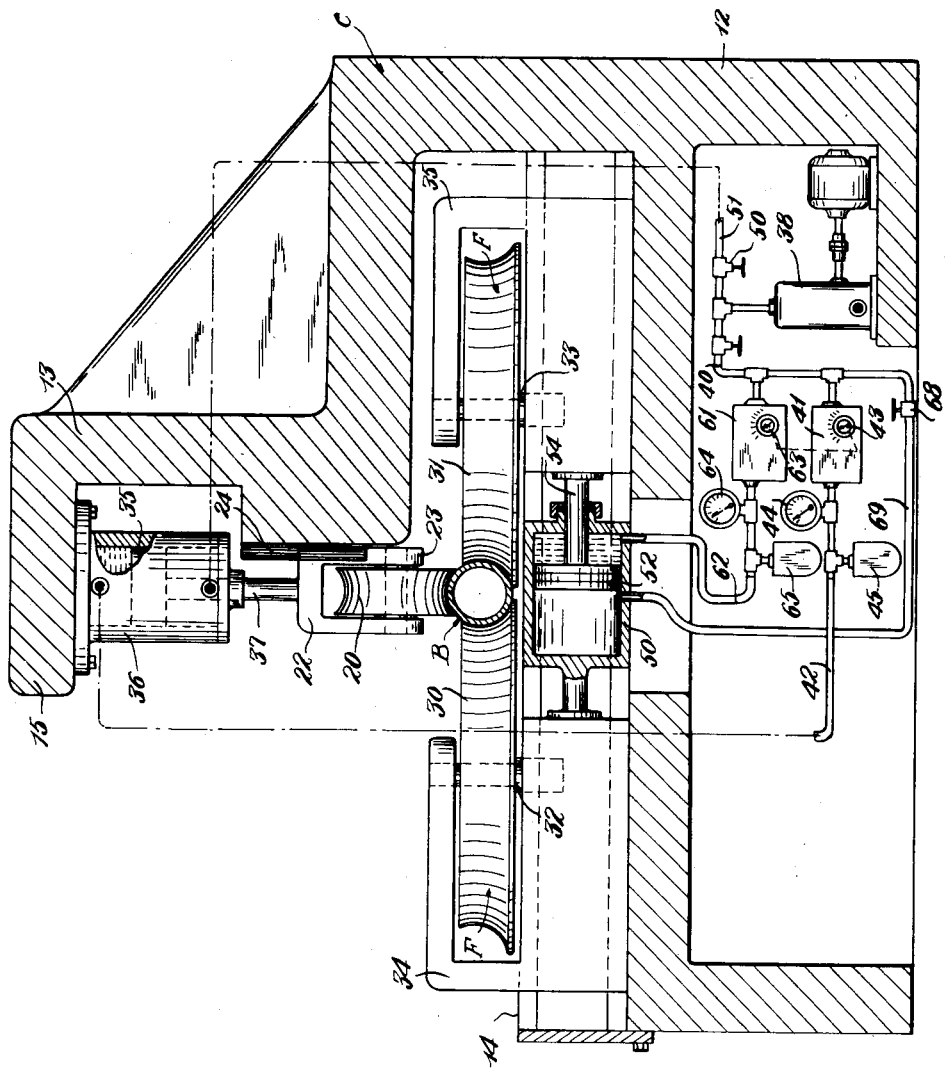

Patented Jan. 22, 1952

2,582,963

UNITED STATES PATENT OFFICE 2,582,963

SEAM-WELDING APPARATUS

John F. Cachat, Cleveland, Ohio, assignor to The Ohio Crankshaft Company, Cleveland, Ohio, a corporation of Ohio Application May 7, 1949, Serial No. 91,918

6 Claims. (Cl. 219—6)

This invention pertains to the art of continuous seam welding of metallic members and, more particularly, to a means and method for bringing the edges to be welded into the proper welding engagement.

The invention is particularly adapted, although, insofar as it now appears, not limited, to the continuous welding of opposed edges of a moving metallic strip into a length of pipe wherein the edges in spaced relationship are heated by high-frequency electric induction heating, and subsequently brought into pressure-welding engagement. In such types of heating, high-frequency electric currents are induced to flow in a concentrated form in the extreme edges of the strip whereby only a very narrow band of the strip adjacent the edges is heated to the welding temperature. The ratio of the width of this band to the strip thickness may be, for thin strip, in the neighborhood of four or five, and for thicker strip, approaching unity. Inductors capable of inducing high-frequency electric currents of the type just referred to are described in the copending applications of Phillips N. Sorenson, Serial No. 58,228, filed November 4, 1948, and Serial No. 86,066, filed April 7, 1949, and Alfred C. Body, Serial No. 86,054, filed April 7, 1949, and the method of inducing these currents will not be further detailed herein. Reference is made to these applications for a further understanding of the methods and apparatus for inducing these high-frequency electric currents and heating the edges.

After the edges of the strip are brought up to the welding temperature by the methods decribed in these applications, they are then quickly brought into pressure-welding engagement. This pressure at the welding temperature effects a welded seam.

Normally, the heated edges are brought into this pressure-welding engagement by a plurality of rolls, dies or the like engaging the sides of the strip which are positioned as close as possible to the exit end of the high-frequency inductor. These rolls are normally made adjustable in a direction transverse to the axis of movement of the strip so that the pressure on the edges may be adjusted to the proper amount to obtain a good weld.

With such apparatus, but with some difficulty and experimentation, extremely satisfactory welds have been obtained, in that the welded seam has an extremely small bead, an excellent grain structure approaching that of the remainder of the body of the pipe, a high ductility substantially the same as the ductility of the remainder of the pipe and a high tensile strength.

On the other hand, and particularly before the present invention, difficulty has been experienced in obtaining a uniformly excellent weld over a continuous length of pipe or from day to day or from one size pipe to another or when returning to a size pipe previously welded. As a result of the present invention, it has been determined that such nonuniformities in the welded seam are caused at least in part by variations in the welding pressure on the edges as they are brought into welding engagement.

The present invention has also indicated that, at least when using high-frequency induction heating, the welding pressure on the heated edges is quite critical. As stated above, the band of metal heated to the welding temperature is very narrow. The temperature of the heated band is preferably brought almost to the melting point of the metal. Too much pressure on the edges appears to squeeze out the highly heated metal because of its high fluidity and the metal of the edges which finally effects the weld actually is not at the proper or desired welding temperature. The result is a brittle weld having no ductility or crush strength; that is, the weld breaks where the pipe is flattened using the welded seam as one of the bend points.

On the other hand, if not enough pressure on the heated edges is used, either no weld or one having very low strength results. Both overpressure and underpressure welds and the perfect weld may appear identical when superficially examined, except for the bead formed, but the physical tests soon show the difference. With the high linear speed of the pipe obtainable using high-frequency induction heating, it will be appreciated that should some factor disturb the original adjustments unbeknownst to the operator, a large amount of scrap pipe will result before the defect or flaw is discovered.

Some of the causes of this nonuniformity of welding over a length of tube have been determined as a result of the present invention, these being; e. g., dirt on the side of the metal strip as it enters the rolls, expansion or contraction of the machine due to temperature changes in the course of a day's operation, a variation in the thickness of the strip, or a variation in the width of the strip, the latter cause appearing to have a far greater effect than the former causes.

Prior to the present invention, the rolls or dies or the like of a seam-welding machine were adjusted so as to obtain the desired welding pressure by means of a feed or lead screw adjusted from the front of the machine by means of a handle, crank or the like. Such a lead screw was provided with what may be terms as "self-locking" threads; that is, the pitch of the threads was such that when the rolls were once adjusted in pressure engagement with the sides of the strip, the reactive pressure on the rolls did not tend to disturb this adjustment. Additionally, the lead screw was locked to prevent rotation. To back the rolls off required unlocking and actually turning the lead screw in a reverse direction. In practice, the rolls were adjusted manually until the desired weld is obtained, at which time the exact spacing between the rolls was fixed by clamping the lead screw or otherwise.

With the rolls so fixed and as the present invention has indicated, slight variations in the width of the strip, dirt on the rolls or variations in the thickness of the strip effect a relatively wide variation in the pressure of the rolls on the sides of the strip and, thus, the welding pressure between the heated edges of the strip. It has been determined that this variation is sufficient to radically affect the uniformity of a weld and obtained in a continuous operation.

Another difficulty has been in re-establishing conditions once before determined as desirable for a particular size and shape of pipe. The usual practice in tubing mills is to run various sizes of pipe from day to day, thus necessitating changes in the adjustments of the rolls in the machine. Duplicating previous adjustments has been a time-consuming operation and one wasteful of many feet of unwelded or poorly welded pipe.

In view of the foregoing, the present invention has for one of its objects and contemplates providing new and improved seam-welding apparatus so constructed and arranged that the welding pressure on the heated edges of the strip will remain completely uniform regardless of any variations in strip width, strip thickness, dirt on the rolls, temperature variations or the like.

The invention also contemplates and has for its object seam-welding apparatus having apparatus for accurately indicating the pressure between the edges to be welded.

The invention also contemplates apparatus for seam welding the edges of metallic members wherein the members for pressing the edges into welding engagement may float in a constant but adjustable pressure engagement with the sides of the pipe and, thus, move laterally relative to each other while still exerting the same constant preset pressure on the edges.

The invention also contemplates seam-welding apparatus wherein a uniformity of results may be obtained between a number of individual welding machines or between individual setups on any one machine.

Generally speaking, the invention comprises the combination of a seam-welding machine for continuously welding the opposed edges of a relatively thin metallic strip or strips wherein the edges are heated, while in spaced relationship, by high-frequency induction heating and a plurality of members move the heated edges into pressure-welding engagement, the members floating or being freely movable laterally relative to the plane of the edges while, at the same time, exerting and maintaining a constant and uniform but adjustable welding pressure between the heated edges. The machine may also include apparatus for continuously indicating the exact floating pressure between the edges.

The invention may be preferably embodied in apparatus for urging the members into engagement with the sides of the pipe under a constant pressure, including a hydraulic servo-mechanism energized from a pressure source through an adjustable pressure-regulating means, the entire hydraulic system having a characteristic such that changes in volume resulting from possible lateral movement of the members do not materially affect the pressure; i. e., a system having the characteristics of $PV^n = K$, wherein P equals the unit pressure, V equals the unit volume and K equals a constant and the exponent $n$ approaches zero.

The invention may be alternatively embodied in apparatus including a lead screw for the members actuated by a motor of the adjustable but constant torque type or a system of adjustable weights, the lead screw being of the fully reversible type; that is, having a lead angle of approximately forty-five degrees. Another alternative embodiment may include a spring having a low deflection rate. Weights and a system of levers could also be employed.

In each of the above instances, the embodiment may include equipment for indicating the exact pressure of the rolls against the pipe and, thus, the welding pressure between the heated edges. In the case of the hydraulic means, this equipment might be embodied in a hydraulic pressure-indicating gauge; in the case of the torque motor, an electric meter; in the case of a spring, means for indicating the total amount of deflection of the spring itself and in the case of the weights and levers, by a weight-position indicator.

Figure 2 is a side sectional view partly in elevation of Figure 1 taken approximately on the line 2—2 thereof.

Figure 1:
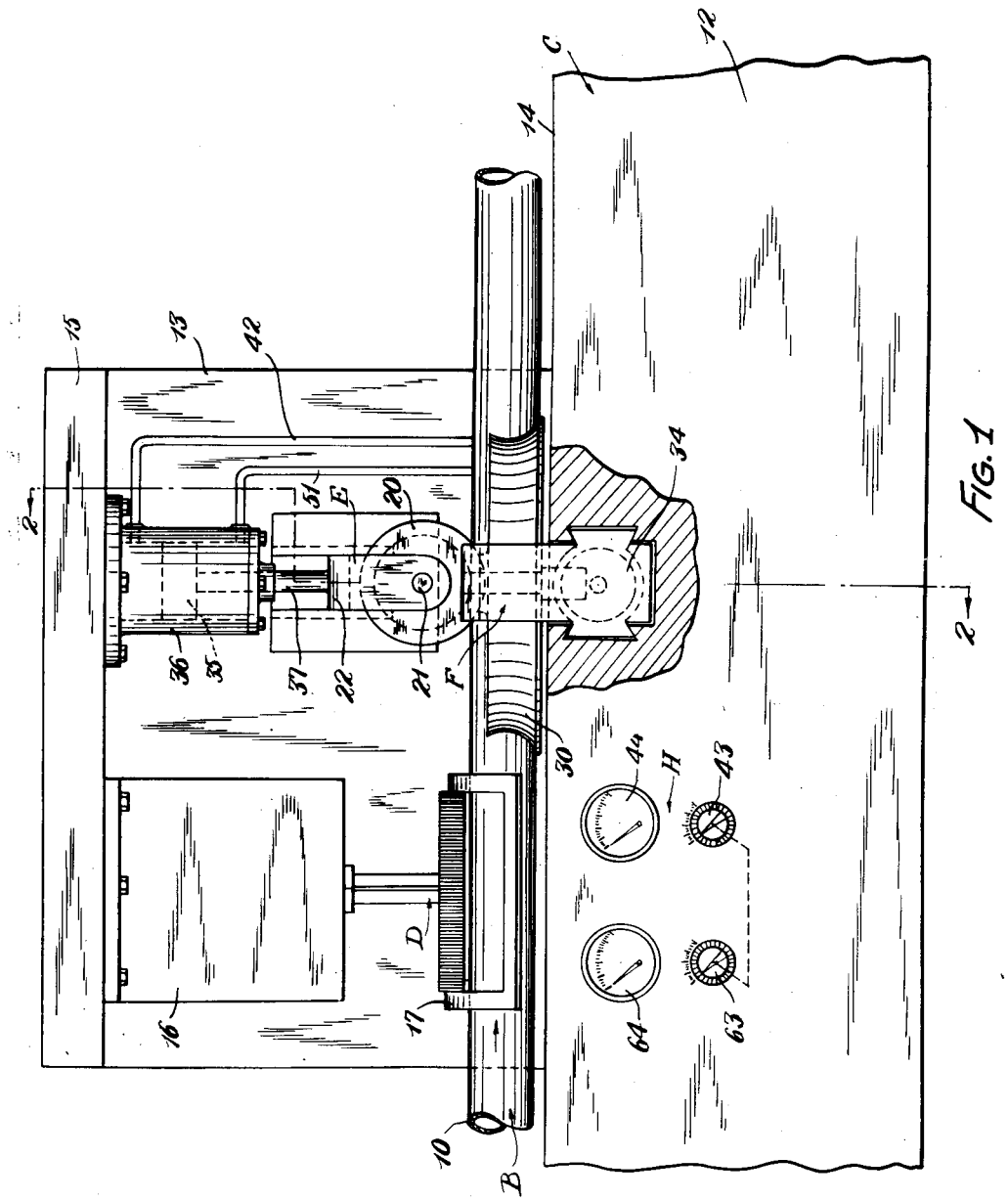
Figure 1 is a generally schematic front elevational view of a seam-welding machine embodying the present invention.

Referring now to the drawings wherein a preferred embodiment of the invention is shown for the purposes of illustration only and not for the purposes of limitation, Figure 1 shows a generally schematic fragmentary part of a seam-welding machine A with a C-shaped metal strip B moving from left to right and having spaced, opposed edges 10 to be welded.

The welding machine shown comprises generally a main supporting frame C, a high-frequency electric inductor and associated apparatus D for heating the edges 10, a vertical roll assembly E and a horizontal roll assembly F for pressing the edges 10 into welding engagement, the pressure of the engagement being controlled and indicated by an indicating and control mechanism H mounted on the front of the frame C.

The strip B shown may be of any desired electrically-conducting metallic material such as steel, copper, iron or the like. It enters the machine continuously from the right with the edges 10 being uppermost and leaves the machine as a complete welded tube.

The welding-machine frame C comprises generally a base 12 and a backstand 13 set back from the front edge of the base 12 and extending above its upper surface 14. The exact construction of the frame C forms no part of the present invention and will not further be elaborated on in this specification. Suffice it to say that any desired frame construction may be employed of sufficient strength to withstand the stresses and strains of seam welding.

The high-frequency inductor assembly D heats the opposed edges 10 at an extremely rapid rate by causing high-frequency electric currents to flow in these edges by an electric induction process well known. The inductor assembly D comprises generally an impedance matching transformer 16 mounted on a forwardly-extending overhang 15 of the backstand 13 and a high-frequency inductor 17 supported from the lower side of the transformer. The inductor 17, in the embodiment shown, is of the type described in the second mentioned Sorenson application above. Other inductors could be employed. The inductor 17 is mounted in close spaced relationship to the pipe B and the pipe passes from left to right therepast.

The welding roll assemblies E, F are positioned just to the right or the exit end of the inductor 17 and act to press the heated edges 10 into pressure-welding engagement as they leave the inductor 17 to effect a welding action.

The vertical roll assembly E comprises generally a roll proper 20 rotatable on a horizontal axis by a shaft 21, which shaft is, in turn, mounted in a bearing block 22 vertically slidable in the backstand 13.

The roll 20 has a concave outer edge having a radius of curvature to correspond to the radius of curvature of the pipe B when finally welded. The exact construction of the roll forms no part of the present invention. The exact curvature may be varied within limits to provide suitable and desired sizing and shaping effects on the pipe B. The shaft 21 together with the roll 20 and the bearing block 22 are movable as a unit in a vertical plane. Any desired mechanism for permitting this vertical movement of the roll 20 may be provided. However, in the embodiment shown, the bearing block 22 has on its rear a tongue 23 which slides in a vertical channel 24 formed in the backstand 13. The construction shown provides rigidity of construction. Other forms of slides could be provided.

The horizontal assembly F comprises a pair of identical roll members 30, 31, one on each side of the tube B mounted for rotation about spaced vertical axes by shafts 32, 33, in turn supported for rotation in bearing blocks 34, 35, all respectively. As shown, the bearing blocks 34, 35 are reciprocable in a horizontal plane transverse to the direction of movement of the pipe B in a groove formed in the base 12. Here, as in the vertical roll assembly, a tongue-and-groove arrangement between the blocks 34, 35 and the walls of the slot are provided to guide the movement of the blocks back and forth.

The rolls 30, 31 are conventional and have concave outer surfaces to correspond to the curvature of the pipe B.

As the pipe B moves from left to right, the rolls 30, 31 press against the side of the pipe and exert a substantial pressure which forces the opposed edges 10 into firm pressure-welding engagement. In a like manner, the vertical roll 20 is pressed downwardly upon the upper surface of the pipe B and aids materially in forcing the edges 10 into the proper welding engagement.

It will be appreciated that other roll assemblies could be provided if necessary to the right of the existing roll assemblies.

Also, other types of members for forcing the edges 10 into pressure-welding engagement could be employed.

The apparatus described so far, while illustrating a preferred construction of seam-welding apparatus, forms no part of the present invention except insofar as the parts or their equivalents cooperate or are controlled in accordance with the present invention.

The present invention contemplates apparatus for maintaining the rolls 20, 30 and 31 in the same and constant pressure relationship with the sides of the tube B regardless of any variations in strip width or otherwise which might occur.

The invention also contemplates a seam-welding machine of the type particularly adapted for use for high-frequency induction heating wherein an indication of the pressure of the rolls on the pipe and thus the pressure between the edges 10 is at all times accurately indicated and may be readily controlled to a constant predetermined value.

The preferred embodiment of the invention shown comprises hydraulic mechanism associated with each of the rolls together with mechanism for holding the pressure constant at any predetermined value and apparatus for indicating the pressure of the rolls against the sides of the pipe.

Referring now to Figure 2, the vertical roll assembly E is moved vertically by a piston 35 and cylinder 36 arrangement mounted on the lower side of the overhang 15 and directly above the bearing block 22. The piston 35 is rigidly connected with the bearing block 22 by a piston rod 37. Hydraulic pressure on the upper side of the piston 35 will urge the bearing block and thus the vertical roll 20 against the upper side of the pipe B.

Pressure to the upper side of the piston 35 is supplied from a pressure source 38 through a conduit 40, a pressure regulator 41 and a conduit 42. The pressure regulator may be of any desired known type having a readily controllable outlet pressure; e. g., a gear pump having a pressure-controlled, by-pass valve or a diaphragm-type regulator could be employed. In the embodiment shown, the regulator 41 is provided with a pressure-regulator control 43 for controlling its outlet pressure. In some instances, the pressure-regulator control 43 may be sufficiently accurately calibrated that when the control is set to any predetermined value, the pressure on the actual side and, thus, on the upper surface of the piston 35 will remain constant and at the calibrated value. If a greater degree of control is desired, a pressure gauge 44 may be provided to indicate the pressure in the hydraulic line 42. Again, if the pressure regulator is of the type not capable of maintaining a constant outlet pressure with movements of the piston 35, a surge tank 45 may be provided which has a substantial air volume therein. The characteristic desired of the hydraulic system is that after the pressure has once been established, movements of the pistons 35 in either direction will not change the pressure on its upper side or in the hydraulic line 42. As a matter of convenience for raising the roll 20 when it is desired to change pipe, pressure may be admitted to the lower side of the piston 35 from the pressure source through a valve 50 and a conduit 51.

For controlling the pressure of the rolls 30, 31 against the sides of the pipe B, a slightly different cylinder arrangement is employed while the pressure-regulating system may be identical to that described with reference to the vertical-roll assembly E. Thus, in the embodiment of the invention shown, a piston 52 and cylinder 53 arrangement is provided. In this instance, the piston-cylinder arrangement is disposed intermediate the bearing blocks 34, 35 with the cylinder 53 being mounted on and movable with the bearing block 34 and the piston being rigidly connected to the bearing block 35 by means of a connecting rod 54 and thus movable with the movements of the bearing block 35. Hydraulic pressure is admitted to the right-hand face of the piston 52 from the pressure source through a separate pressure control 61 and a hydraulic line 62. A control 63 for regulating the outlet pressure may be provided, which control may be of the type which, while independently adjustable, may also be ganged with and movable with the control 43. Thus, after the desired ratio of pressure between the horizontal rolls 30, 31 and the vertical roll 20 has been established, the pressure of the rolls may be varied by means of a single control while still maintaining the same ratio of pressure. In a like manner to that described with reference to the vertical rolls, a pressure-indicating gauge 64 and a surge tank 65 may be provided.

It will be seen that pressure admitted to the right-hand side of the piston 52 serves to move the bearing blocks 34, 35 and thus the rolls 30, 31 toward each other whereby the rolls 30, 31 will exert the identical pressure against the sides of the pipe B. Also, should the pipe B have any tendency to weave laterally, the rolls 30, 31 may move as a unit readily to compensate for this lateral movement while still exerting a constant pressure. If by any chance the circumference of the strip should vary as it passes through the rolls, the rolls 30, 31 may move relative to each other while still exerting a uniform pressure against the sides of the pipe. Any changes in the cylinder volume due to relative movements of the rolls 30, 31 will not effect pressure changes due either to the existence of the surge tank 65 or the constant pressure output of the pressure regulator or both.

In case it is desired to move the rolls 30, 31 about so as to install a new size of pipe or the like, pressure is applied to the left-hand side of the piston 52 from the pressure source through valve 68 and conduit 69.

As shown in Figure 1, the pressure gauge 44 and 64 and the pressure-regulating controls 43 and 63 may be mounted on the front side of the base 12 where they are readily accessible to the operator or setup man.

It will be appreciated that other methods for moving the rolls into an adjustable fixed pressure relationship with the sides of the pipe may be employed, which means may also be such that the rolls 30, 31 in particular and the roll 20 may move relative to each other while, at the same time, maintaining a uniform pressure against the sides of the pipe. For example, lead screws may be employed having a pitch angle of 45 degrees; that is to say, they are of the nonlocking type, which have a constant torque applied thereto and the rolls may thus continue to exert a uniform pressure against the pipe even though they must move relative to each other from time to time for the various causes referred to above. The lead screw may have the constant torque exerted thereon by any suitable means such as the system of weights and levers, a stalled adjustable torque motor, or springs.

Alternatively, the bearing blocks 22, 33 and 34 can be urged in the appropriate direction by means of spring members such as helical coil springs. If springs are to be used, they should have a relatively long or low deflection rate such that the rolls may move to compensate for changes in dimension without substantially changing the pressure of the rolls against the pipe. In the event springs are to be used, suitable means can be provided for indicating the total deflection of the spring from its normal unstressed state. Such means would give a relative indication of the pressure of the rolls against the sides of the pipe and it would enable an operator to repeat conditions on successive setups of the same sized pipe.

It will be appreciated that the embodiments described are preferred embodiments only to illustrate the invention. Modifications and alterations will occur to others upon a reading and understanding of the specification. It is my intention to cover all such modifications and alterations insofar as they come within the scope of the appended claims.

Having thus described my invention, I claim:

1. In combination, a seam-welding machine for continuously welding the opposed edges of a generally C-shaped metal strip including a high-frequency, induction-heating inductor for inducing high-frequency currents to flow in the edges and raise them to the welding temperature and a plurality of members adjacent the exit side of the inductor for pressing the heated edges into welding engagement, said members being adjustably supported in a direction generally transverse to the line of movement of said strip, the improvement which comprises a piston and cylinder arrangement for moving said members into pressure engagement with said strip and a source of hydraulic pressure supplied to said piston-cylinder arrangement, said hydraulic system having a characteristic of $PV^n = K$ where P equals the unit pressure, V equals the unit volume and K equals a constant and $n$ approaches zero, whereby said members may move to correspond to variations in said strip while all the time exerting a substantially uniform pressure against said strip.

2. In combination, a seam-welding machine for continuously pressing the heated opposed edges of a generally C-shaped metal strip into welding engagement including a plurality of members adjacent the exit end of the inductor for pressing the heated edges into welding engagement, said members being adjustably supported in a direction at least generally transverse to the line of movement of said strip, pressure-exerting apparatus interconnecting and supported solely by said members for urging said members toward said strip, said members and apparatus being freely movable in said direction generally transverse to the line of movement of said strip, means for adjusting said apparatus and the pressure of said members on said strip, said members exerting a floating uniform pressure on said strip through any lateral movements of said members.

3. In combination, a seam-welding machine for continuously pressing the heated opposed edges of a generally C-shaped metal strip into welding engagement including a plurality of members for pressing the heated edges into welding engagement, said members being adjustably supported in a direction at least generally transverse to the line of movement of said strip, pressure-exerting apparatus interconnecting and supported solely by said members for urging said members toward said strip, said members being freely movable in said direction generally transverse to the line of movement of said strip, means for adjusting said apparatus and the pressure of said members on said strip, said members exerting a uniform pressure on said strip through any lateral movements of said members, said apparatus including indicating means for indicating the actual pressure of said members against said strip.

4. In combination, a seam-welding machine for continuously welding the opposed edges of a C-shaped metal strip including a high-frequency, induction-heating coil for inducing high-frequency currents in the edges and raising them to the welding temperature, a plurality of members adjacent the exit end of the inductor for pressing the heated edges into welding engagement, said members being movable on aligned paths of movement, a cylinder rigidly connected to one of said members, a piston slidable in said cylinder and rigidly connected to another of said members, and a pressure source for energizing said piston and said cylinder and moving said members toward said strip, said automatic pressure source including pressure-regulating apparatus including means for holding the pressure constant to any predetermined adjusted value while allowing relative movement between said movable members due to variations in the width of the strip or in the lateral position of the strip.

5. In combination, a seam-welding machine for continuously welding the opposed edges of a C-shaped metal strip including a high-frequency, induction-heating coil for inducing high-frequency currents in the edges and raising them to the welding temperature, a plurality of members adjacent the exit end of the inductor for pressing the heated edges into welding engagement, said members being movable on aligned paths of movement, a cylinder rigidly connected to the support of one of said members, a piston slidable in said cylinder and rigidly connected to the support for another of said members, and a pressure source for energizing said piston and said cylinder and moving said members toward said strip, said pressure source including pressure-regulating apparatus including means for holding the pressure constant to any predetermined adjusted value while allowing relative movement between said movable members caused by variations in the width or the lateral position of said strip, and pressure-indicating apparatus.

6. In combination, a seam-welding machine for continuously welding the opposed edges of a C-shaped metal strip including a high-frequency, induction-heating coil for inducing high-frequency currents in the edges and raising them to the welding temperature, a plurality of members adjacent the exit end of the inductor for pressing the heated edges into welding engagement, said members mounted on supports movable on aligned paths of movement, a lead screw having a lead angle of approximately forty-five degrees threadably engaged with said support and constant-torque means for turning said lead screw and advancing said members into pressure engagement with said strip.

JOHN F. CACHAT.

REFERENCES CITED

The following references are of record in the file of this patent:

UNITED STATES PATENTS

| Number | Name | Date |
| --- | --- | --- |
| 1,700,408 | Holt | Jan. 29, 1929 |
| 1,915,047 | Blakeslee | June 20, 1933 |
| 1,956,172 | Holt | Apr. 24, 1934 |
| 1,999,805 | Dyer | Apr. 30, 1935 |
| 2,237,551 | Darner | Apr. 8, 1941 |
| 2,240,896 | Sonnichsen | May 6, 1941 |